United States Patent [19]

Von Glahn et al.

[11] 3,801,804

[45] Apr. 2, 1974

[54] DRUM DRIVEN DOCUMENT BACK-UP ROLLER

[75] Inventors: William F. Von Glahn, Plymouth; Ronald G. Shell, Dearborn Heights, both of Mich.

[73] Assignee: Burroughs Corporation, Detroit, Mich.

[22] Filed: Dec. 4, 1972

[21] Appl. No.: 311,463

[52] U.S. Cl. ....... 235/61.11 D, 271/51, 340/174.1 R

[51] Int. Cl. ........................... B65h 5/06, G06k 7/08

[58] Field of Search .............. 235/61.11 R, 61.11 D; 271/51; 274/4 J; 340/174.1 R

[56] References Cited

UNITED STATES PATENTS

| | | | |
|---|---|---|---|
| 3,734,491 | 5/1973 | Beery et al. | 271/51 |
| 3,109,924 | 11/1963 | Frederick | 235/61.11 D |

*Primary Examiner*—Thomas J. Sloyan
*Attorney, Agent, or Firm*—Edwin W. Uren; Paul W. Fish; Charles S. Hall

[57] ABSTRACT

A high speed document sorter-reader having a magnetizing head, at least one read head disposed in a read station, and a transport drum for transporting documents through the read station utilizes a rim-driven roller for rotatably supporting and holding transported documents in close cooperating proximity with the read head, such roller being driven directly by the transport drum and at a uniform speed therewith when a document is not present in the read station, and driven by the transported document upon entry of the document thereinto, clearance of less than the thickness of a document being maintained between the roller and the read head when a document is not present in the read station, whereby the skewing of documents caused by inertial resistance to the leading edges thereof and wear to the roller and head are eliminated.

15 Claims, 5 Drawing Figures

DRUM DRIVEN DOCUMENT BACK-UP ROLLER

BACKGROUND OF THE INVENTION

The invention resides in the provision of a predeterminedly-configured roller for use in association with each document read station in automatic document processing apparatus, said rollers being cooperably disposed relative to their corresponding read heads in the read stations and to a transport drum effective for transporting documents at high speed through the read stations, each of said rollers being rotated by the transport drum at a uniform speed therewith to thereby provide resistance-free back-up support for the documents as they are transported past their corresponding read heads, such resistance-free support serving to hold the documents in close proximity to the read head in the read station to thereby assure effective reading that is unhampered by document skewing resulting from inertial resistance to the leading edges of the documents.

An example of the types of document processing apparatus in which the inventive roller may be used to advantage is disclosed in U. S. Pat. No. 3,114,902 which is owned by the assignee of the present application, such disclosed apparatus being a check reader and sorter the operation of which is herein briefly described with reference to FIG. 1. In the disclosed check sorting and reading apparatus, MICR encoded checks, which is to say checks that have been encoded with ferromagnetic indicia, are placed in a hopper compartment generally designated at 3 and individually fed by a driven belt 5 into a guideway 7 to the control of a driven burst roller 9, the driven burst roller serving to activate the individual checks at high speed along a guideway 11 to the control of a driven transport drum 13, the transport drum 13 activating the individual checks through a read station and along a guideway 15 to a plurality of selectable pockets generally designated at 17. A plurality of motors 18 are utilized for rotating the belt 5, the roller 9 and the drum 13. Rotatable rollers 19 are disposed along the guideways 7, 11 and 15 to provide free movement of the checks therealong, and a plurality of Beam-o-Lights 21 are disposed along the guideways to provide effective monitoring of check movement and to shut the apparatus down should the free flow of checks be interrupted. As the individual checks are transported around the transport drum 13, the ferromagnetic indicia encoded thereon is magnetized by a magnetizing head 23, and the magnetized indicia read by a read head 25, such magnetizing and reading being accomplished as the individual checks are transported at high speed around the transport drum 13 and into the guide way 15.

Critical to the effective reading of the magnetized indicia by the read head 25, is the holding of the check, and in particular that area thereof that contains the magnetized indicia, in close proximity to the operative end 27 (FIG. 2) of the read head 25, the guideway 11 at the point 29 not being effective for this purpose. Various means have accordingly been utilizing for holding the checks in close readable proximity to the read head 25, as for example the stationary resiliently supported member 31 shown in FIG. 2, such stationary member being disclosed in U. S. Pat. No. 3,109,924 also ownded by the assignee of the present application. As disclosed in this latter patent, the member 31 is anchored at one end to a fixed post 33 and connected at the other end to a spring 35, the member 31 being resiliently held in close proximity to the operative end 27 of the read head 25 by a roller 37. This stationary resilient-member arrangement has tended to present inertial resistance to the leading edges of the checks as they are transported into readable alignment with the read head 25, such inertial resistance having resulted in document skewing and buckling, with the accompanying misreads are rejects that an attendant thereto, and resulted also in gradual wear of the member 31.

Use of a rotatable non-driven roller at the point 29 adjacent the operative end 27 of the read head 25 also failed to eliminate document skewing and to significantly reduce the number of misreads and rejects. As a matter of fact, the inertial resistance problem was found to be aggravated by the momentary shock caused by the impact of the leading edges of the checks against the stationary roller, and aggravated also during acceleration of the roller from its quiesent state to a speed proximate the speed of the transport drum.

Although in a somewhat different application of check handling and reading apparatus an effective solution to the inertial resistance and skewing problem was provided by the use of a resilient roller frictionally coupled to a driven shaft, as disclosed in U. S. Pat. No. 3,734,491, also assigned to the assignee of the present application, such arrangement could not be expected to eliminate the document skewing problem in check sorting and reading apparatus of the type above described with reference to FIG. 1, the high speed movement of the checks in such apparatus requiring that the rollers be driven at a uniform speed with the transport drum and with the speed of travel of the checks through the read station.

SUMMARY OF THE INVENTION

It is accordingly an object of the present invention to provide effective means for holding checks and other ferromagnetically encoded documents in close readable proximity to the read heads in the read stations of automatic document processing apparatus, wherein checks are transported at high speed past the read heads.

It is a further object of the present invention to render such document holding and supporting means free of wear resulting from the repetitious impacting of the leading edges of the documents thereagainst.

It is a still further object of the present invention to render such document holding means free of inertial resistance that would tend to buckle or to skew the documents and to thereby produce misreads and document rejects.

An important aspect of the present invention is the provision of a predeterminedly configured roller as an effective means for holding checks and documents in close readable proximity to the operative ends of read heads such as shown at 27 in FIG. 1, such roller being drivably rotatable by the transport drum at uniform speed therewith regardless of whether or not a check or document is movably positioned in the read station, a direct drive from the transport drum being provided when a check or document is not movably positioned in the read station, and an indirect drive imparted by the moving document being provided when a check or document is so positioned.

Another important aspect of the present invention is the provision of a predeterminedly configured roller wherein the configuration thereof permits of a direct drive from the transport drum and at the same time provides a minimal gap between the roller and the operative end 27 of the read head 25, such minimal gap being slightly less than the thickness of the checks or documents processed by the check or document processing apparatus, an additional purpose of such minimal gap being the avoidance of wear of the roller or the read head during rotation of the roller when a document is not present in the read station.

BRIEF DESCRIPTION OF THE DRAWING

These and other objects, advantages and aspects of the invention will be more clearly understood from the following description when read in conjunction with the accompanying drawing in which.

DESCRIPTION OF THE PREFERRED EMBODIMENT

Figure 3:
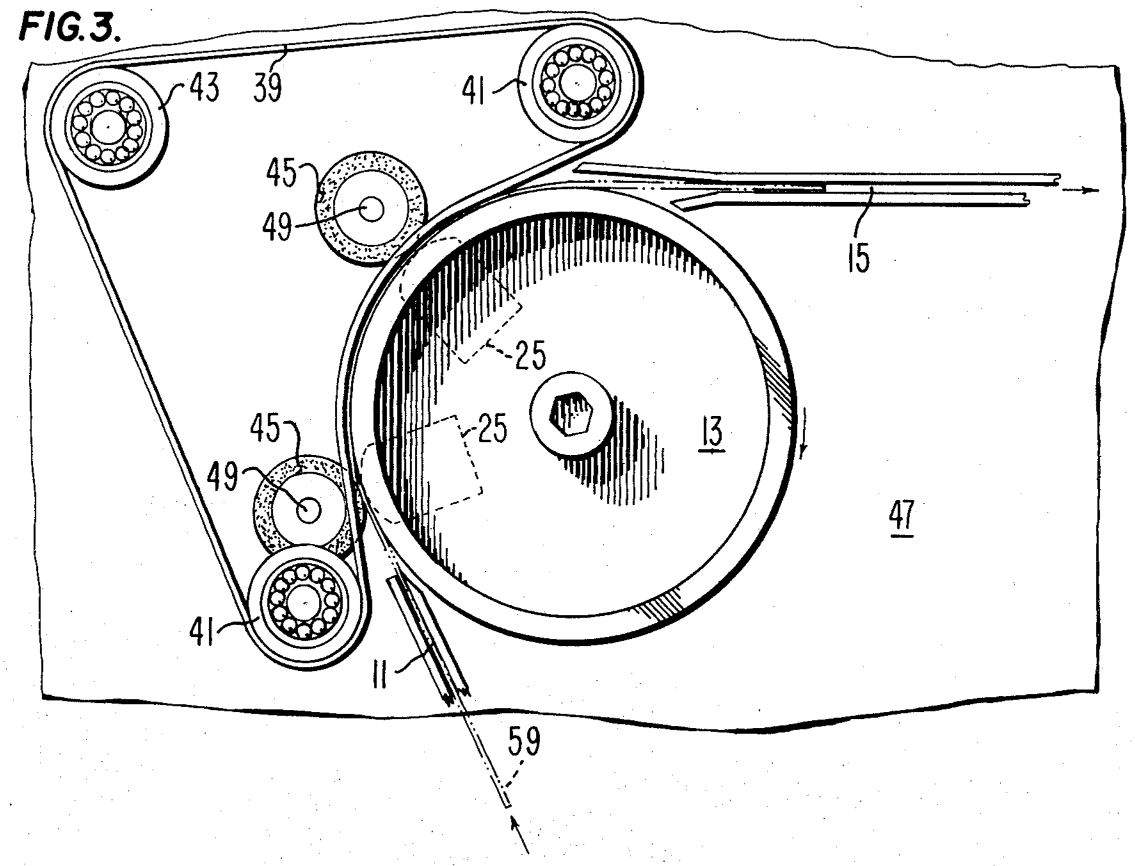
FIG. 3 is a plan view of the transport drum in association with a driven feed belt and with a pair of the predeterminedly-configured rollers disposed in cooperating relationship with a pair of read heads.

As previously indicated, the present invention resides in the provision of a predeterminedly configured driven roller for use in association with each read station in check or document reading and sorting apparatus, the roller being driven by the transport drum 13 at a uniform speed therewith, the rotating roller serving to effectively hold the transported checks or documents in close readable proximity to the operative end 27 of the read head 25, two such rollers and read heads being shown in FIG. 3, as for example to provide both a shallow and a deep reading of each check or document.

Figure 1:
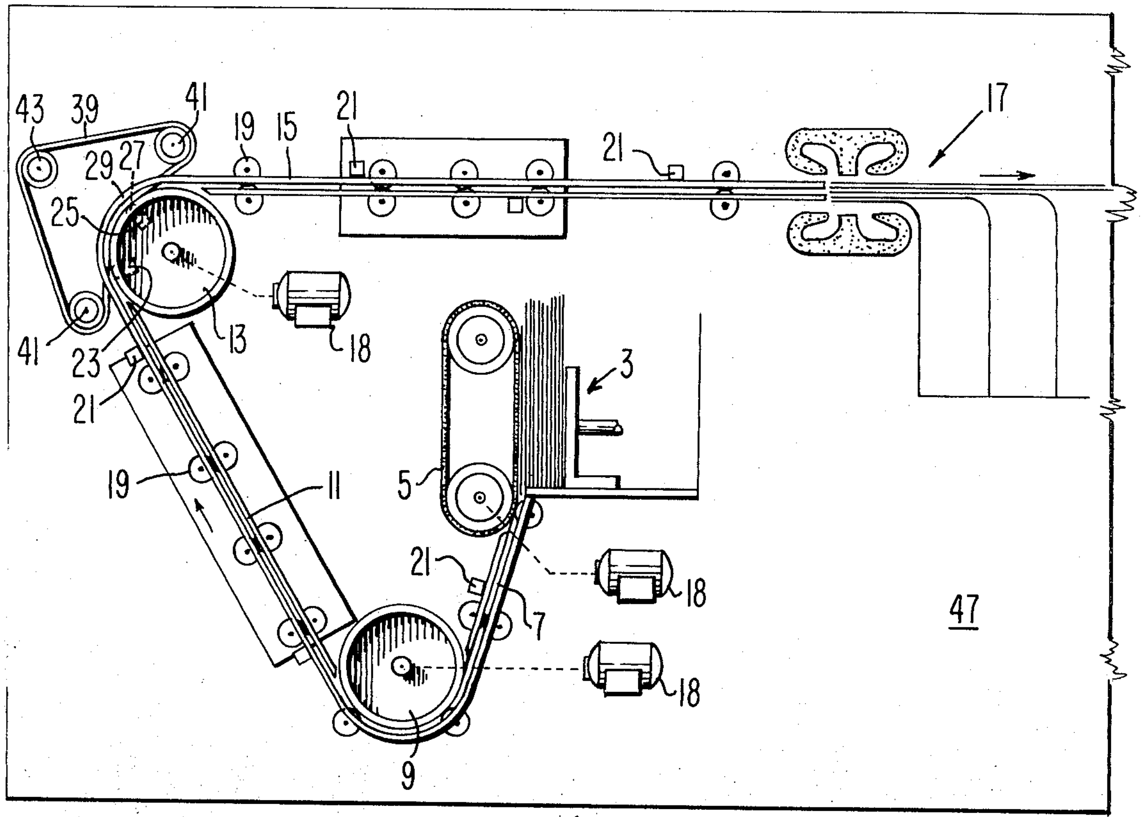
FIG. 1, as previously noted, is a plan view of automatic check processing apparatus in which the inventive predeterminedly-configured roller is particularly useful.

It is to be noted from FIG. 3 that the checks or documents are transportably fed around the transport drum 13 by means of a rotatable feed belt 39, such belt being supported by a pair of rollers 41 disposed a predetermined spaced-apart distance adjacent the periphery of the transport drum 13, and a central roller 43 disposed a greater distance away from the periphery of the transport drum 13, the three rollers providing a triangular configuration of the feed belt 39, the hypotenuse thereof, as formed by the rollers 41 being deformed to grippably cooperate with the periphery of the transport drum. It is further to be noted that the substantially triangularly configured feed belt 39 and the preponderance of the transport drum 13 lie on a plane above the plane of the inventive rollers, hereinafter designated by the reference number 45, and that the feed belt 39 and transport drum 13 are both disposed on a plane above the plane of the read head or heads 25. The feed belt 39 is accordingly effective to securely grip the uppermost portion of each check or document that is activated along the guideway 11 (FIG. 1), and to thereby transport the gripped document around the transport drum 13 past the read heads 25 into the guideway 15 leading to the pockets 17. As each check or document is so gripped by the belt 39 and transported around the transport drum 13, the magnetized indicia disposed on a line adjacent the bottom edge of each check is read by each of the read heads 25, the roller 45 associated with each read head being effective, as hereinafter explained, to hold the check or document, and particularly the lower portion thereof bearing the ferromagnetic indicia, in close readable proximity to its associated read head.

Figure 4:
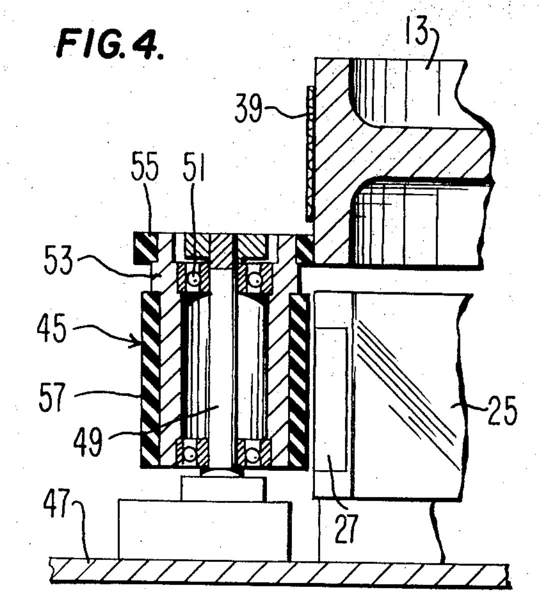
FIG. 4 is a fragmentary elevational view of the transport drum and read head in association with the inventive predeterminedly-configured roller, a document not being shown in the read station.
Figure 5:
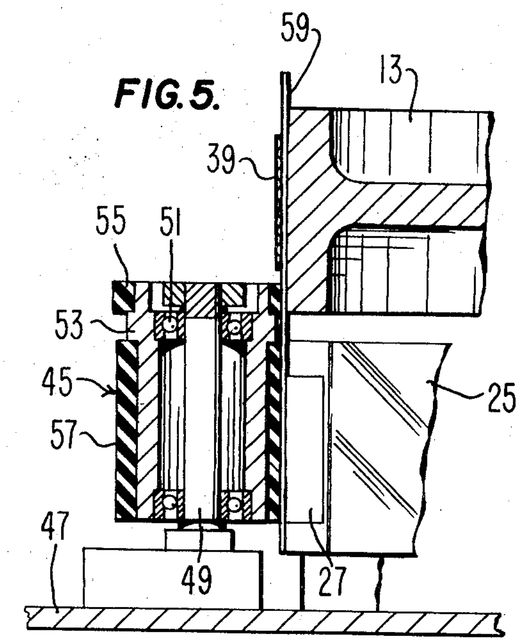
FIG. 5 is a fragmentary elevational view similar to that shown in FIG. 4 but with a check or document transportably disposed between the transport drum and the read head, on one side thereof, and the feed belt and inventive roller on the opposite side.

It can be seen from FIGS. 4 and 5 that each of the rollers 45 is rotatably mounted on a base plate 47 by means of a fixed shaft 49, such shaft preferably being adjustable, well known ball bearings being provided as indicated at 51 to assure friction-free rotation of the roller 45 on the shaft. Each of the rollers 45 is provided with a uniformly radiused hub 53 extending the full length of the roller, and provided also with a pair of differently radiused and axially dimensioned respectively, peripheral ring 55 and 57, respectively, each ring being constructed of an elastic material suitable for frictional cooperation with a check or document, both rings 55 and 57 being secured to the hub 53. The axial length of the roller 45, and of the hub 53 thereof, should be sufficient to span the vertical linear dimension of the operative end 27 of its associated read head 25, as well as the vertical space between the read head 25 and the transport drum 13, and the lower portion of the transport drum 13 lying below the feed belt 39. The peripheral rings 55 and 57 may preferably be spaced apart a distance equivalent to the space between the read head 25 and the transport drum 13, the axial length of the ring 57 being sufficient to span the operative end 27 of the read head 25, and the axial length of the ring 55 being sufficient to provide overlapping cooperation with the lower portion of the transport drum 13. The outer diameter of the ring 55, relative to the diameter of the hub 53 and the location of the shaft 49, should be sufficient to provide effective gripping cooperation with the transport drum 13, such gripping cooperation resulting in a minimal compression of the ring 55 when a document is not present therebetween, and in a slightly increased compression of the ring 55 during the transport of a document past the read head 25. The outer diameter of the peripheral ring 57 should be such as to provide a gap minimal between the ring 57 and the operative end 27 of the read head 25 slightly less when a document is not present in the read station, such gap being than the thickness of the checks or documents being processed and effective for slightly compressing the ring 57 when a document is transported past the read head, which is to say the outer diameter of the ring 57, on the hub 53 should be smaller than the outer diameter of the ring 55 by an amount slightly less the thickness of the documents that being processed.

The effect of the predetermined radial thickness and resiliency of the ring 55 is to provide driving contact as between the drum 13 and the roller 45 when a document is not present therebetween and to provide input drive from the drum 13 to the roller 45 through the document when a document is being transported past the read head 25, the roller surface speed being thereby rendered equal to the drum surface speed regardless of the presence or absence of a document and regardless of the thickness of the documents being processed. The effect of the predetermined radial thickness and resiliency of the ring 57 is to provide a wear-saving gap between the rotating roller 45 and the read head 25 when a document is not present in the read station, and, when a document is being transported past the read head, to provide intimate contact between the document and the read head as well as complementary and anti-skewing drive to the document.

It can be seen from FIGS. 3, 4 and 5 that the upper portion of a check or document that has been activated at high speed along the guideway 11 (FIG. 1) would be grippably received between the rotating transport drum 13 and the feed belt 39, the check or document being thereby activated at a continuing uniform speed along the guideway 15 to a selected pocket 17. As a check or document is so gripped and activated around the transport drum 13, the ferromagnetic indicia disposed on the lower portion thereof would first be magnetized by a magnetizing head (not shown in FIG. 3 but illustrated at 23 in FIG. 2), the magnetized indicia being thereafter read by one or more read heads 25 as the check or document is activated thereby, the lower portion of the check being held in close readable proximity to the operative end 27 of the read head by the second peripheral ring 57 of the roller 45, the ring 57 being compressed a predetermined minimal distance by the presence of the check between the read head and the roller, as previously described, such minimal distance being equivalent to the excess of the documents thickness dimension and the gap provided between the ring 57 and the operative end of the read head. The presence of a document between the roller 45 and the read head 25 would also serve to compress the first ring 55 an additional distance, as also previously described, such additional distance being equivalent to the width of the document as illustrated in FIG. 5 wherein a document is shown in interposed relationship between the belt 39 and the transport drum 13, and between the roller 45 and the operative end 27 of the read head. The frictional contact of the first ring 55 with the transport drum 13, as well as the normal gap provided between the second peripheral ring 57 and the read head 25, is illustrated in FIG. 4.

Figure 2:
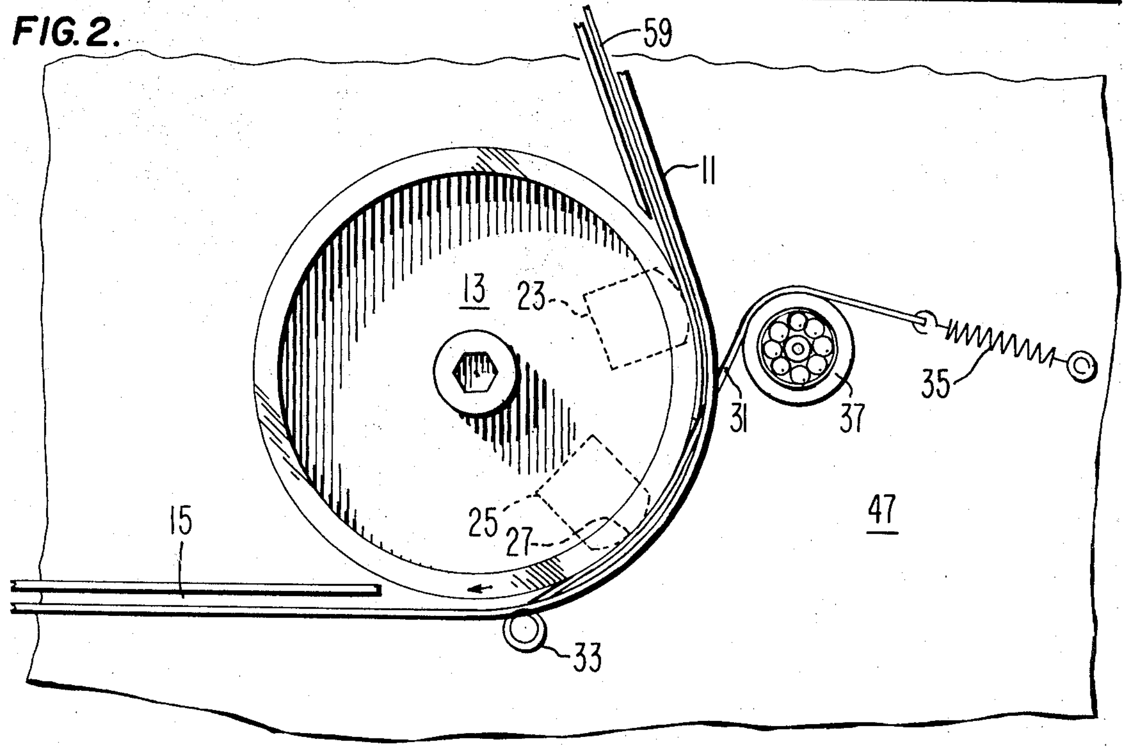
FIG. 2 is a plan view of the transport drum, magnetizing head and read head of FIG. 1 shown in association with a previously known stationary resiliently supported member for holding the processed checks in close proximity to the read head.

It will be apparent that a roller 45 may be mounted along the periphery of the transport drum 13 at the point of the magnetizing head 23, which would provide an arrangement similar to that shown in FIG. 3 but wherein the lowermost magnetic head designated at 25 in the drawing, would be a magnetizing or write head as illustrated at 23 in FIG. 2. In the event two read heads 25 are desired, as illustrated in FIG. 3, a third head, of a magnetizing nature, could be included, along with a third roller 45, or the magnetizing head could be accommodated by other back-up holding means such as illustrated at 31 in FIG. 2, it being found that the magnetizing of the ferromagnetic indicia is less critical than the reading thereof by the read heads.

It will be apparent from FIG. 4 that the roller 45 will be rotated directly by the transport drum 13 when a check or document is not present in the read station, such direct drive resulting from the aforementioned frictional contact of the first ring 55 with the lower portion of the transport drum. Upon entry of the leading edge of a check or document between the first ring 55 and the transport drum 13, however, the roller 45 will be driven at a continuing uniform speed by contact of the ring 55 with the backside of the moving document, the document being transportably driven by the transport drum 13 as grippably secured thereto by the feed belt 39.

While a preferred embodiment of the document driven roller has been shown and described in considerable detail, it will be understood that variations and modifications in the configuration and structure thereof may be made without departing from the true spirit and scope of the invention.

What is claimed is:

1. In a document read station in document reading apparatus wherein magnetized encoded indicia on the documents is read by a read head as the documents are individually transported at high speed by and along the peripheral surface of a transport drum, a rotatably mounted predeterminedly-configured roller disposed on cooperable driven relationship relative to said drum and in back-up supporting relationship relative to said read head, said roller comprising:

a. a unitary hub member rotatably supported on a fixed shaft in contiguous vertical and horizontal alignment with said read head, b. a first resilient ring fixed to said hub member in cooperating relationship with said peripheral surface of said drum, and c. a second resilient ring fixed to said hub member in spaced apart relationship with said first ring and disposed in predetermined clearing relationship with said read head when a document is not present in said read station, and in frictional back-up and driving contact with a said document during the transport thereof through said read station, whereby said roller is rotated directly by said transport drum by means of said first ring and in clearing wear-preventing relationship with said read head when a document is not present in said read station, and rotated at a continuing uniform speed by said first ring through a said transported document upon entry thereof into said read station to thereby provide intimate contact of said document with said read head by means of said second ring and to prevent misreading of documents caused either by documents skewing or by the inertial resistance to the leading edges of the documents upon entry thereof into the read station.

2. The predeterminedly-configured roller as defined in claim 1 wherein said first and said second rings are made of an elastic material having a high coefficient of friction with said peripheral surface of said transport drum and with the broadside of said documents transported individually through said read station.

3. The predeterminedly-configured roller as defined in claim 1 wherein the radial thickness of said first ring fixed to said hub member is greater than the radial thickness of said second ring by an amount less than the thickness of said encoded documents transported through said read station of said apparatus.

4. The predeterminedly-configured roller as defined in claim 3 wherein, as determined by said radial thicknesses of said first and said second rings and by the mounting of said roller in said driven cooperable relationship with said transported drum and in said back-up supporting relationship with said read head, said first ring compressibly cooperates with a portion of said peripheral surface of said drum when a document is not present in said read station, and said second ring spans the vertical linear dimension of an operative end of said read head and is displaced therefrom by a distance less than the thickness of said encoded documents transported through said read station.

5. The predeterminedly-configured roller as defined in claim 4 wherein, as determined by said radial thicknesses of said first and said second rings and by the mounting of said roller in said driven cooperable relationship with said transport drum and in said back-up supporting relationship with said read head, said first ring compressibly cooperates with and is driven by the backside of a document when a document is transportably positioned in said read station, and said second ring compressibly cooperates with the backside of said transported document to thereby hold said document in frictional back-up and driving contact with said operative end of said read head.

6. In machine reading apparatus for reading ferromagnetic indicia encoded on documents, said apparatus having a document input hopper and a document output stacker, guideway means communicating with said hopper and said stacker, transport means associated with said guideway means and effective for transporting documents at high speed along said guideway means from said hopper to said stacker, an improved document processing station including a write station and a read station disposed intermediate said hopper and said stacker and additionally comprising:

a. a driven transport drum forming a part of said transport means, b. a magnetizing head located in said write station and effective for magnetizing said ferromagnetic indicia encoded on said documents as said documents are transported thereby by said transport drum, c. at least one read head located in said read station and disposed downstream of said write station, operative ends of said magnetizing head and said read head being vertically and coplanarly aligned with the periphery of said transport drum and spaced apart a minimal predetermined distance therefrom, d. an endless belt rotatable about a plurality of triangularly arranged rollers such that a portion of the belt is disposed in frictional contact with a corresponding portion of the periphery of said transport drum to be rotated thereby in the direction of document transport, and e. a rotatably mounted predeterminedly-configured roller disposed in cooperable driven relationship relative to said drum and in back-up supporting relationship to said operative end of said read head, said roller being comprised of a unitary hub member and a first and a second resilient ring fixed to said hub member in spaced-apart relationship, whereby said predeterminedly configured roller is rotated directly by said drum by means of said first ring and in clearing wear-preventing relationship with said operative end of said read head when a document is not present in said read station, and rotated at a continuing uniform speed by said first ring through a said transported document upon entry thereof into said read station to thereby provide intimate contact of said document with said operative end of said read head by means of said second ring and to prevent misreading of documents caused either by document skewing or by the inertial resistance to the leading edges of the documents upon entry thereof into the read station.

7. The improved document processing station defined in claim 6 wherein said first and said second rings of said predeterminedly configured roller are made of an elastic material having a high coefficient of friction with said transport drum and with the broadside of said documents transported individually through said read station.

8. The improved document processing station defined in claim 6 wherein the radial thickness of said first ring of said predeterminedly-configured roller is greater than the radial thickness of said second ring by an amount less than the thickness of said documents transported through said read station.

9. The improved document processing station defined in claim 8 wherein, as determined by said radial thicknesses of said first and said second rings and by the mounting of said predeterminedly configured roller in said driven cooperating relationship with said transport drum and in said back-up supporting relationship with said read head, said first ring compressibly cooperates with a portion of the peripheral surface of said drum when a document is not present in said read station, and said second ring spans the vertical linear dimension of the operative end of said read head and is displaced therefrom by a distance less than the thickness of said documents transported through said read station.

10. The improved document processing station defined in claim 8 wherein, as determined by said radial thicknesses of said first and said second rings and by the mounting of said predeterminedly configured roller in said driven cooperating relationship with said transport drum and in said back-up supporting relationship with said read head, said first ring compressibly cooperates with and is driven by the backside of a document when a document is transportably positioned in said read station, and said second ring compressibly cooperates with the backside of said transported document to thereby hold said document in frictional back-up and driving contact with the operative end of said read head.

11. A rotatably mounted predeterminedly configured roller for use in association with a transport drum and a magnetic read head located in a read station in document reading apparatus, said read head being effective for reading ferromagnetic indicia encoded on documents as said documents are transported past said read head by said transport drum, said roller comprising:

a. a unitary hub member rotatably supported on a fixed shaft in contiguous vertical and horizontal alignment with said read head, b. a first resilient ring fixed to said hub member in cooperating relationship with the peripheral surface of said drum, and c. a second resilient ring fixed to said hub member in spaced-apart relationship with said first ring and disposed in predetermined clearing relationship with said read head when a document is not present in said read station, and in frictional back-up and driving contact with a said document during the transport thereof through said read station, whereby said roller is rotated directly by said transport drum by means of said first ring and in clearing wear-preventing relationship with said read head when a document is not present in said read station, and rotated at a continuing uniform speed by said first ring through a transported document upon entry thereof into said read station to thereby provide intimate contact of said document with said read head by means of said second ring to thereby prevent misreading of the documents caused either by document skewing or by the inertial resistance to the leading edges of the documents upon entry thereof into said read station.

12. The roller defined in claim 11 wherein said first and said second rings are made of an elastic material having a high coefficient of friction with said peripheral surface of said transport drum and with a broadside of said documents transported individually through said read station.

13. The roller defined in claim 11 wherein the radial thickness of said first ring fixed to said hub member is greater than the radial thickness of said second ring by an amount less than the thickness of said encoded documents transported by said drum through said read station.

14. The roller defined in claim 13 wherein, as determined by said radial thicknesses of said first and said second rings and by the mounting of said roller relative to said transport drum and to said read head, said first ring compressibly cooperates with a portion of said peripheral surface of said drum when a document is not present in said read station, and said second ring spans the vertical linear dimension of an operative end of said read head and is displaced therefrom by a distance less than the thickness of said encoded documents transported through said read station.

15. The roller defined in claim 13 wherein, as determined by said radial thicknesses of said first and said second rings and by the mounting of said roller relative to said transport drum and to said read head, said first ring compressibly cooperates with and is driven by the backside of a document when a document is transportably positioned in said read station, and said second ring compressibly cooperates with the backside of said transported document to thereby hold said document in frictional back-up and driving contact with said read head.

* * * * *

UNITED STATES PATENT OFFICE
CERTIFICATE OF CORRECTION

Patent No. 3,801,804 Dated April 2, 1974

Inventor(s) William F. Von Glahn, Ronald G. Sholl

It is certified that error appears in the above-identified patent and that said Letters Patent are hereby corrected as shown below:

Col. 1, line 60, change "utilizing" to --utilized--;
line 66, change "ownded" to --owned--.
Col. 4, line 54, change "gap minimal" to --minimal gap--;
line 55, change "slightly less than when a document is not present in the read station, such gap being than the thickness" to --when a document is not present in the read station, such gap being slightly less than the thickness--;
line 63, change "the thickness of the documents that being processed" to --than the thicknes of the documents being processed--.

Signed and sealed this 13th day of August 1974.

(SEAL)
Attest:

McCOY M. GIBSON, JR.
Attesting Officer

C. MARSHALL DANN
Commissioner of Patents

USCOMM-DC 6037
☆ U.S. GOVERNMENT PRINTING OFFICE : 1969 O—

FORM PO-1050 (10-69)